March 10, 1959 — B. WEIL — 2,877,047
STRETCHER HAVING RETRACTABLE LEGS
Filed April 5, 1956 — 2 Sheets-Sheet 1
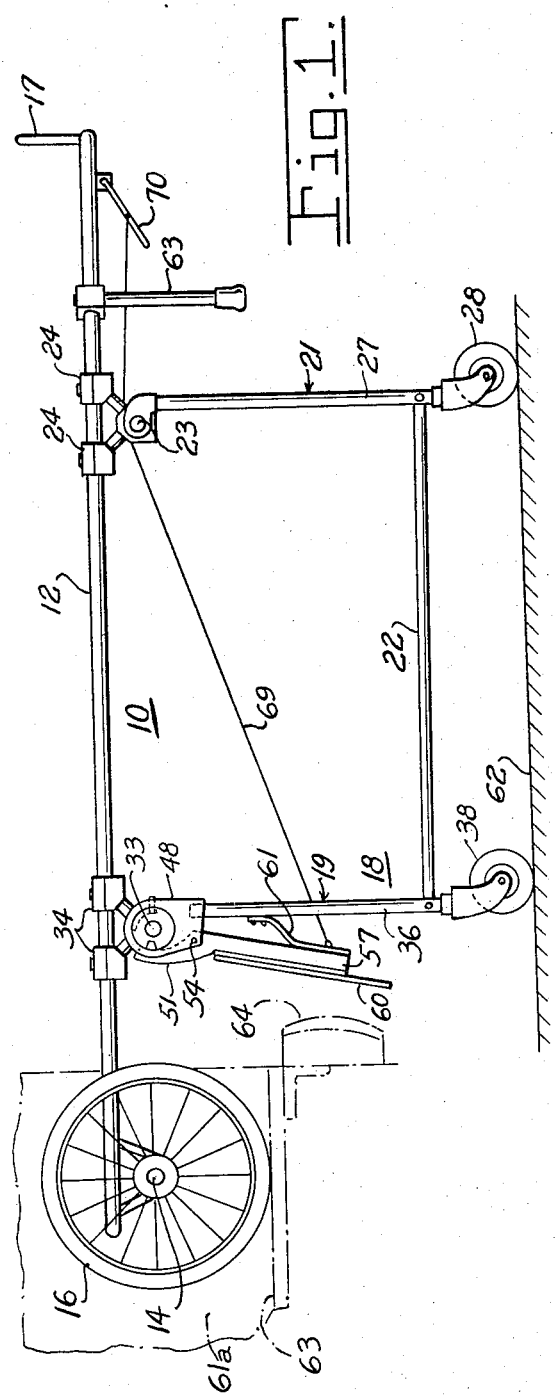
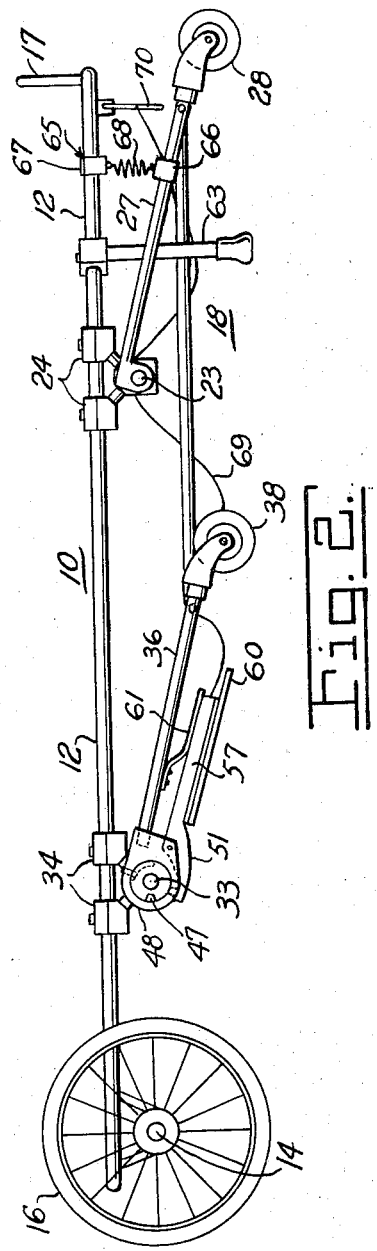
INVENTOR.
BURT WEIL

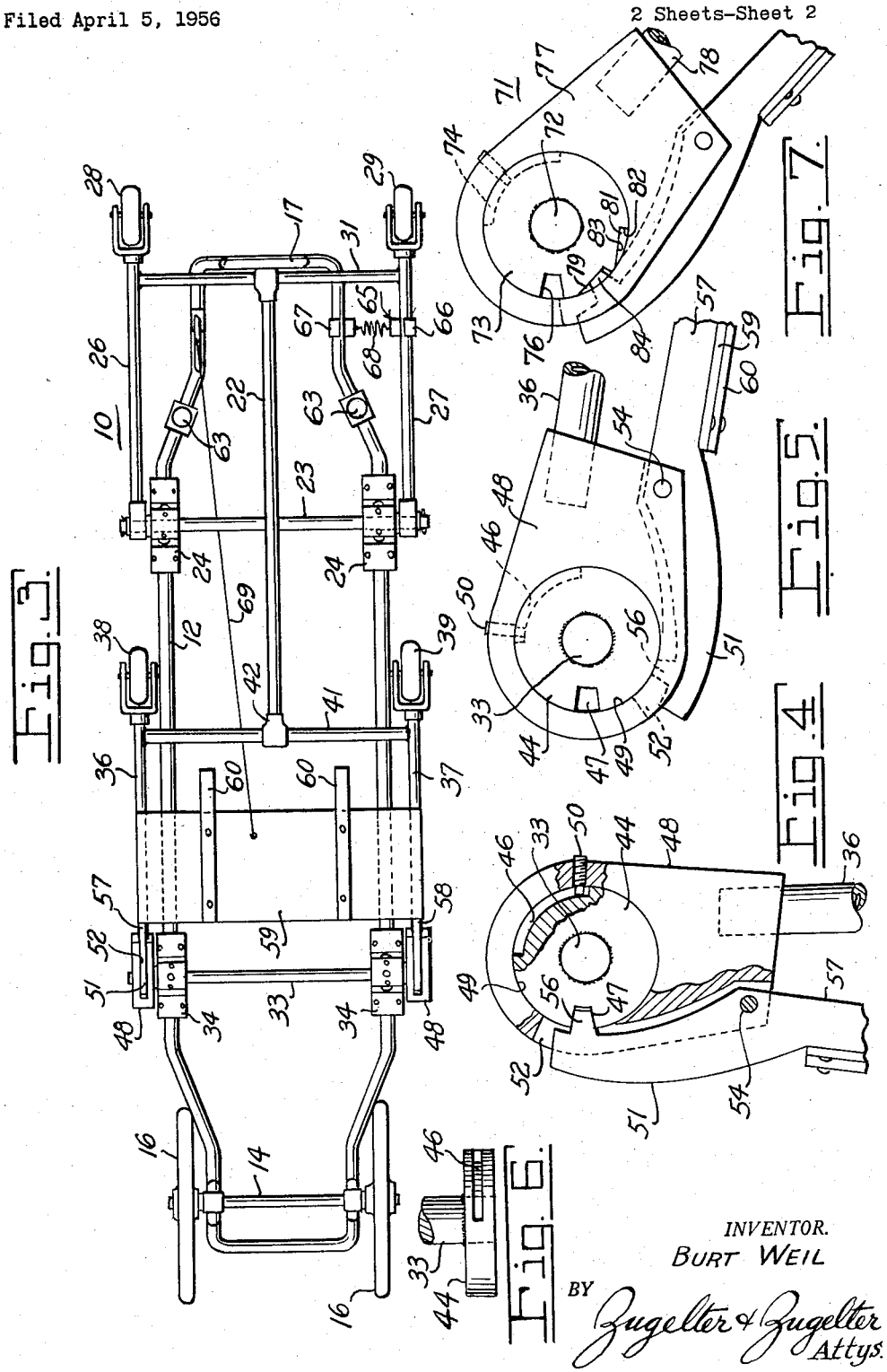

United States Patent Office 2,877,047
Patented Mar. 10, 1959

2,877,047

STRETCHER HAVING RETRACTABLE LEGS

Burt Weil, Cincinnati, Ohio

Application April 5, 1956, Serial No. 576,461

4 Claims. (Cl. 296—20)

This invention relates to a cart having a collapsible supporting framework.

An object of this invention is to provide a cart having an undercarriage which supports a bed portion of the cart at an elevated position and which is adapted to collapse against the underside of the bed portion so that the cart can be carried inside a vehicle.

A further object of this invention is to provide a cart which can be rolled to a vehicle with the undercarriage holding the bed of the cart at the level of the floor of the vehicle and can be advanced into the vehicle with the undercarriage collapsing as the cart advances.

A further object of this invention is to provide a cart of this type having wheels at one end thereof which support that end while the cart is advanced into the vehicle, the cart being adapted to be operated by a single person supporting the opposite end of the cart as the undercarriage collapses.

A further object of this invention is to provide a cart of this type having a latch which holds the undercarriage in elevated or upright position and a latch operator which engages the vehicle as the cart is advanced into the vehicle and releases the latch to permit the undercarriage to collapse.

The above and other objects and features of the invention will be apparent to those skilled in the art to which this invention pertains from the following detailed description and the drawings, in which:

Figure 1 is a view in side elevation of a cart constructed in accordance with an embodiment of this invention, the cart being shown in association with a portion of a vehicle, the vehicle being shown in dot-dash lines;

Fig. 2 is a view in side elevation of the cart with the undercarriage in collapsed position;

Fig. 3 is a bottom plan view of the cart with the undercarriage in collapsed position;

Fig. 4 is an enlarged fragmentary view, partly in side elevation, and partly in section, showing details of construction of a leg-locking arrangement which forms a part of the cart, in the position assumed when the legs of the cart are in upright position;

Fig. 5 is an enlarged fragmentary view in side elevation showing the leg-locking mechanism in collapsed position;

Fig. 6 is a plan view of a ring member which forms a portion of the leg-locking arrangement with the leg assembly removed; and Fig. 7 is a fragmentary view in side elevation showing a leg-locking arrangement of a cart constructed in accordance with another embodiment of this invention.

In the following detailed description, and the drawings, like reference characters indicate like parts.

In Figs. 1–3 inclusive is illustrated a cart 10 constructed in accordance with an embodiment of this invention.

The cart 10 includes an elongated, hollow frame 12 which may be formed of sections of metal tubing, or the like. The frame 12 is of the type used in ambulance carts and mortician's carts. An appropriate canvas sheet or the like (not shown) may be mounted on and span the members of the frame 12.

At one end of the frame 12 is mounted an axle 14 on which wheels 16 are rotatably mounted. At the other end of the frame is mounted a handle 17 for use by the operator of the cart.

The cart is provided with an undercarriage indicated generally at 18. The undercarriage 18, as shown in Fig. 1, includes a front leg assembly 19 adjacent the wheels 16, a rear leg assembly 21 spaced therefrom, and a rigid bar 22 linking the leg assemblies so that the leg assemblies can swing together between the upright position shown in Fig. 1, and the collapsed position shown in Fig. 2.

The rear leg assembly 21 is pivotally mounted on an axle 23. Axle 23 extends transversely of the frame 12, as shown in Fig. 3, and is attached thereto by brackets 24 which are mounted on the frame 12. The rear leg assembly includes leg members 26 and 27 which are pivotally mounted on the axle 23. Castors 28 and 29 are mounted on the leg members 26 and 27, respectively. A cross bar 31 is attached to and spans the leg members 26 and 27. One end of the linking bar 22 is pivotally mounted on the cross bar 31.

The front leg assembly 19 is pivotally mounted on an axle 33. The axle 33 extends transversely of frame 12 (see Fig. 3) and is firmly attached thereto by brackets 34 which are mounted on the frame 12. The front leg assembly includes legs 36 and 37 which are pivotally mounted on axle 33. Castors 38 and 39 are mounted on the leg members 36 and 37, respectively. A cross bar 41 is attached to and spans the leg members 36 and 37. The other end of the linking bar 22 is pivotally mounted on the cross bar 31 as indicated at 42.

Details of construction of the pivotal connection between the leg 36 and the axle 33 are shown most clearly in Figs. 4 and 5. The pivotal connection between the leg 37 and the axle 33 is similar, and only the pivotal connection between the leg 36 and the axle will be described in detail. As shown in Fig. 4, a ring member 44 is rigidly attached to the axle 33. The ring member 44 is provided with a circumferential slot 46 in the edge thereof (see Figs. 4 and 6) and a locking slot 47. A head member 48 is mounted on the upper end of the leg 36. The head member has a bore 49 therethrough of substantially the same diameter as the ring member 44. The ring member is received in the bore 49, and the head member 48 and the leg 36 are pivotally mounted on the ring member 44. A pin 50 is mounted in the head member 48 and extends into the circumferential slot 46 to hold the head member in place on the ring member 44.

The leg 36 is held in upright position by a latch 51. The latch 51 is an elongated member and is pivotally mounted on the head member 48. As shown in Figs. 3 and 4, a slot 52 is provided in one side of the head member. The latch 51 is pivotally mounted in the slot 52 on a pivot pin 54. A latch finger 56 at the upper end of the latch 51 is engageable in the locking slot 47 to lock the leg assemblies in the upright position shown in Fig. 1.

As shown in Fig. 1, the latch 51 includes an elongated actuating arm or lever 57. Arm 57 and a similar arm 58 (Fig. 3) which is attached to a latch (not shown in detail) which locks leg 37, are attached to a plate 59 which links the levers to cause both latches to be operated together. Bar members 60 are attached to one face of the plate 59, as shown in Figs. 1 and 3. Springs 61 attached to the legs 36 and 37 urge the latches toward engaged position.

As shown in Fig. 1, when the cart is in elevated position with the leg members locked upright, the wheels 16 are adapted to be advanced into the inside of a vehicle 61a, which may be a hearse, an ambulance, or the like, with the castors supporting the cart on a pavement 62 outside the vehicle. In this position the wheels are barely in engagement with the floor 63 of the vehicle. Then, as the cart is advanced into the vehicle, the weight of the cart may be raised off the castors by an operator (not shown) lifting the handle 17, and the bar members 60 are brought against a bumper 64, or the like, which forms a part of the vehicle. When the bars 60 engage the bumper, the latches are swung counterclockwise, as shown in Fig. 1, about their pivot 54, sufficiently to release the latches. Then, as the cart is advanced farther into the vehicle, the leg assemblies and the latches swing up to the position shown in Fig. 2. In that position the cart can rest on the wheels 16 and on a pair of short fixed legs 63 (see Figs. 2 and 3) which are attached to the frame 12 adjacent the handle 17. If desired, the leg assemblies may be held in the collapsed position by a retainer 65, as shown in Fig. 3. The retainer 65 includes hook members 66 and 67, which fit over the rear leg 27 and the frame 12, respectively. A tension spring 68, links the hook members 66 and 67.

When the cart is to be removed from the vehicle, the retainer 65 is removed and the cart is drawn backwardly out of the vehicle. As the cart is drawn out of the vehicle, the leg assemblies fall under the influence of gravity to the upright position shown in Fig. 1.

One person holding the handle 17 can advance the cart into or withdraw the cart from the vehicle without assistance.

When the cart is in the collapsed position shown in Figs. 2 and 3, it can be supported by handle 17 and rolled on the front or auxiliary wheels 16.

A latch release cable 69 may be attached to the plate 59, as shown in Fig. 1. The latch release cable extends to a latch operating lever 70. The lever 70 is pivotally attached to the frame 12 and may be swung counterclockwise, as shown in Fig. 1 so that the latches can be released manually, if desired.

In the drawings, an ambulance or mortician's cart is shown. However, the frame 12 may be differently shaped or may carry a basket or the like, so that the cart is adapted for use in various manners in which loads may be placed inside of or withdrawn from a vehicle.

In Fig. 7 is shown a leg-locking assembly 71 for a cart constructed in accordance with another embodiment of this invention. The leg-locking assembly 71 includes an axle 72 on which a ring member 73 is rigidly mounted. The ring member 73 has a circumferential slot 74 and a locking slot 76. A head member 77 is pivotally mounted on the ring member 73. The head member is mounted on the upper end of a leg 78. In the foregoing details of construction, the locking assembly 71 is similar to that of the device shown in Figs. 1-5 inclusive. The ring member 73 additionally is provided with intermediate holding slots 79 and 81. Each of the intermediate slots is provided with a latch catching face 82 and a camming face 83. The camming face intersects the edge of the ring member. As shown, the intermediate holding slots are adapted to receive a latch finger 84 to hold the leg at intermediate positions. Other features of the cart of which the locking assembly 71 is a part, may be similar to features of the cart shown in Figs. 1-5 inclusive. The locking assembly 71 of Fig. 7 makes it possible to rest the cart at intermediate heights, as when the cart is collapsed when outside of the vehicle and must be raised to elevated position. The cart can be raised to the intermediate position whereupon the leg-locking assembly 71 holds the cart at the intermediate position. However, when the cart is raised higher, the latch finger 84 can slide out of each intermediate slot along the camming face 83 thereof as the legs fall toward upright position.

The carts illustrated in the drawings and described above, are subject to structural modification without departing from either the spirit or the scope of the appended claims.

Having described my invention, what I claim as new and desire to secure by Letters Patent is:

1. A leg-locking assembly for a cart having a collapsible undercarriage which comprises a disc-shaped member, means for mounting the disc-shaped member on the cart, a head member rotatably mounted on the disc-shaped member, said disc-shaped member having a locking slot in the edge thereof, a leg member on said head member, a latch lever pivotally mounted on the head member, the pivot of the latch lever being spaced from the axis of the disc-shaped member, and a locking finger on the latch lever engageable in the locking slot to latch the legs in upright position, the latch lever and the head member being adapted to swing together about the axis of the disc-shaped member when the latch finger is released.

2. A cart which comprises a bed, an undercarriage mounted on the underside of the bed, said undercarriage comprising a rear leg assembly pivotally attached to the underside of the bed, a front leg assembly, a head member mounted on the upper end of the front leg assembly, a pivot member mounted on the underside of the bed spaced from the pivot of the rear leg assembly, the pivot member pivotally supporting the head member, means linking the leg assemblies for swinging together between an upright position extending downwardly from the bed and a collapsed position adjacent the underside of the bed, wheel means on the leg assemblies for supporting the bed when the leg assemblies are in upright position, a latch operating lever pivotally mounted on the head member spaced from the pivot thereof, a latch member mounted on the latch operating lever and engageable with the pivot member to latch the leg assemblies in upright position, auxiliary wheel means mounted on the front end of the bed for riding on the floor of a vehicle, the latch operating lever extending downwardly from the bed between the auxiliary wheel means and the front leg assembly, the latch operating lever being engageable by the vehicle when the cart is advanced into the vehicle to release the latch, and means attached to the latch operating lever and engageable with the front leg assembly when the latch is released to swing the leg assemblies to collapsed position as the cart is advanced into the vehicle, the latch operating lever and the front leg assembly swinging together about the same axis when the latch is released.

3. A one-man ambulance cart comprising a frame having legs pivotally associated with the frame at its front and rear ends for swinging movement of the legs from an upright position in which the legs extend downwardly from the frame to a collapsed position in which the legs reside adjacent the under side of the frame, the said legs respectively having wheels at their extremities for rolling engagement with the ground, means interconnecting the legs for movement thereof in unison, latch means associated with at least one of the legs for restraining pivotal movement thereof when the said leg is in an upright position, whereby all of the legs are restrained against pivotal movement through said interconnecting means, a latch-release member actuable to render said latch means ineffective to restrain pivotal movement of said leg, and spring means interposed between said latch means and at least one of said legs for resiliently biasing said latch-release member in a direction away from said leg and toward latch-engaging position, whereby actuating pressure exerted on said latch release member when said legs are in erect position stresses said spring means prior to release of said latch means and whereby said legs, when unlatched, move toward collapsed position under the influence of said stressed spring means.

4. A one-man ambulance cart comprising, a bed supporting frame having legs pivotally associated with the frame at its front and rear ends for swinging movement of the legs from an upright position in which the legs extend downwardly from the frame to a collapsed position in which the legs reside adjacent the under side of the frame, the said legs respectively having wheels at their extremities for rolling engagement with the ground, means interconnecting the legs for movement thereof in unison, auxiliary wheel means mounted approximately in the plane of said bed at the front end of said cart, the rear end of said cart being supportable by an operator and the auxiliary wheel means being adapted to run on the floor of a vehicle to support the front end of the cart when the legs are in retracted position, latch means associated with at least one of the legs for restraining pivotal movement thereof when the said leg is in an upright position, whereby all of the legs are restrained against pivotal movement through said interconnecting means, a latch-release member mounted forward of said front legs and below said auxiliary wheel means, said latch-release member being actuable when moved into engagement with the rear of the vehicle by an operator grasping the rear end of said cart in readiness to support said cart and thrust said cart forward with said auxiliary wheels rolling on the floor of the vehicle while the unlatched legs swing to collapsed position.

References Cited in the file of this patent

UNITED STATES PATENTS

| | | |
|---|---|---|
| 910,728 | Russell | Jan. 26, 1909 |
| 2,564,333 | Kelly | Aug. 14, 1951 |
| 2,747,919 | Ferneau | May 29, 1956 |

FOREIGN PATENTS

| | | |
|---|---|---|
| 345,843 | Great Britain | Apr. 2, 1931 |
| 369,456 | Great Britain | Mar. 24, 1932 |
| 429,370 | Great Britain | May 29, 1935 |